May 27, 1958  R. RICHTER ET AL  2,836,100

WIDE ANGLE ANASTIGMATIC OBJECTIVE

Filed May 4, 1955  3 Sheets-Sheet 1

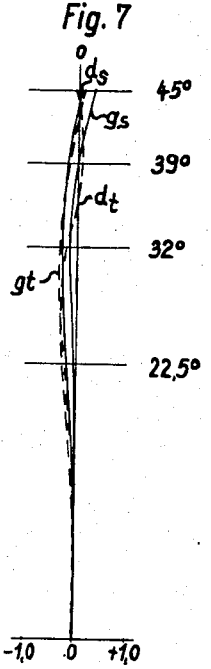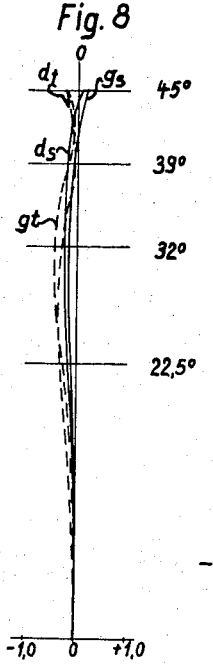

United States Patent Office 2,836,100
Patented May 27, 1958

2,836,100

WIDE ANGLE ANASTIGMATIC OBJECTIVE

Robert Richter, Aalen, and Friedrich Koch, Heidenheim (Brenz), Germany, assignors to Carl Zeiss, Heidenheim (Brenz), Wurttemberg, Germany Application May 4, 1955, Serial No. 505,892

Claims priority, application Germany February 25, 1955

1 Claim. (Cl. 88—57)

The present invention refers to the improvement of anastigmatic objectives for photography and projection containing four meniscus components, two of which are collective meniscus components and two are dispersive meniscus components enclosed by the collective components, whereby the eight exterior surfaces of these four components are all concave towards the space bounded by the dispersive components and the vertex distance of the two facing surfaces of the dispersive components is greater than ⅘ of the arithmetic means of the radii of curvature of these surfaces. Such objectives have been made known through the U. S. Patent Specification 2,031,792.

In the accompanying drawings which serve for illustrating the present invention:

Figs. 1 to 4 show four well-known exemplary types of objective lens systems to which the present invention can be applied, while

Figs. 7 and 8 show diagrams for illustrating the status of correction in the image field.

Figure 1:
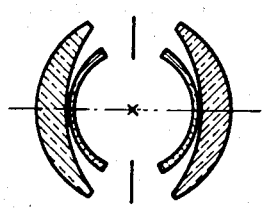
Figure 2:
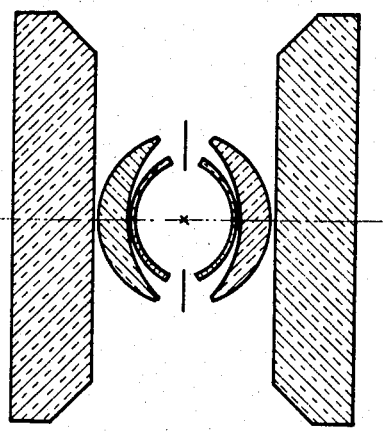
Figure 3:
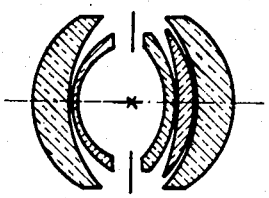
Figure 4:
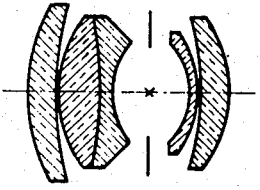

Figs. 1 and 2 show two forms of construction of the above-mentioned specification. Another objective of this kind has been made known through the U. S. patent specification 2,116,264; a form of construction of same is shown in the accompanying Fig. 3. In this form the rear collective component of the above-mentioned four components consists of two menisci separated by a narrow air space. The forms mentioned are suitable for an aperture ratio of ca. 1:6.3 and an image field of ca. 90°. A third form of objectives of the type mentioned became known through a publication in the Jenaer Jahrbuch, 1951, page 58. Such a form is suitable for an aperture ratio of 1:2.8 and an image field of ca. 52°. A copy of an illustration of this publication is reproduced in the accompanying Fig. 4.

In accordance with the invention, the performance of such objectives is considerably improved in that at both sides of the basic components mentioned at least one additional dispersive single lens each is provided as an outer component whose surfaces with the greater curvature are turned toward the above-mentioned space and that in that space a correction system is provided which has a collective power of refraction whose value is at the most ½ of the value of the refractive power of the complete objective. In accordance with the invention it is possible by means of these measures to obtain a far-reaching reduction of the image errors, especially regarding the flattening of the image field and the distortion by increasing the marginal brightness at the same time in comparison with objectives of the above-mentioned form hitherto known. In consequence of the slight refractive power of the correction system the favourable construction of the familiar basic system is preserved, but the correction system, in accordance with the invention mounted at a point between the two halves of the basic system, in spite of the slight refractive power has the strongest effect on the improvement of the astigmatic zonal errors and, in case it is provided with lenses of suitable colour dispersion, also the greatest influence on the elimination of chromatic aberrations of the image curvature.

Reference is made herewith to our prior copending application Ser. No. 372,472 filed August 5, 1953, in which we claim for a wide angle anastigmatic objective for aerial photography and projection purposes of the basic form substantially similar to that of our present application of which the two dispersive meniscus components located as outermost components consist each of a dispersive meniscus element and a converging meniscus element cemented together, and in which the refractive power of the correcting component located substantially at the diaphragm position lies between $-0.2/f$ and $+0.2/f$, while according to the present invention the two further dispersive meniscus components located as outermost components are simple lenses, and in said correcting component located substantially at the diaphragm position the mean refractive index in combination with the radii of its outer surfaces are such that its refractive power is positive and lies between zero power and $+0.5/f$.

Figure 5:
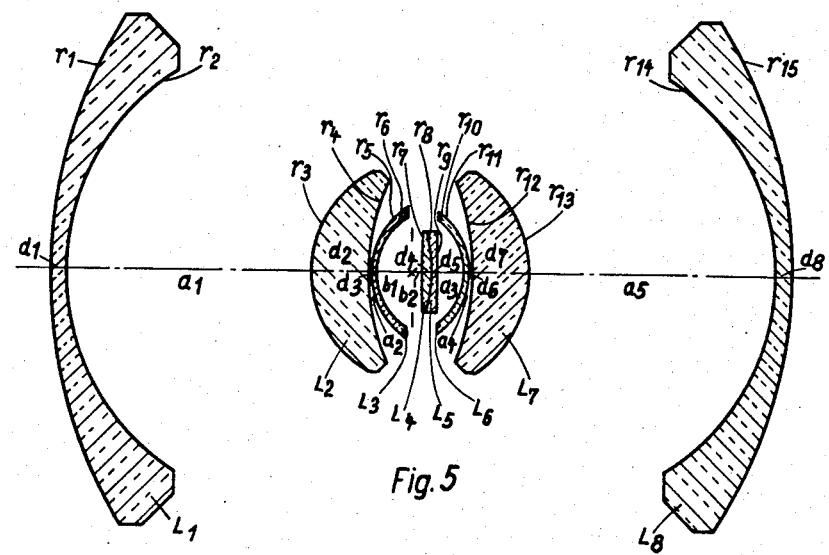
Figs. 5 and 6 show two exemplary embodiments of such objective lens systems in accordance with the present invention.
Figure 6:
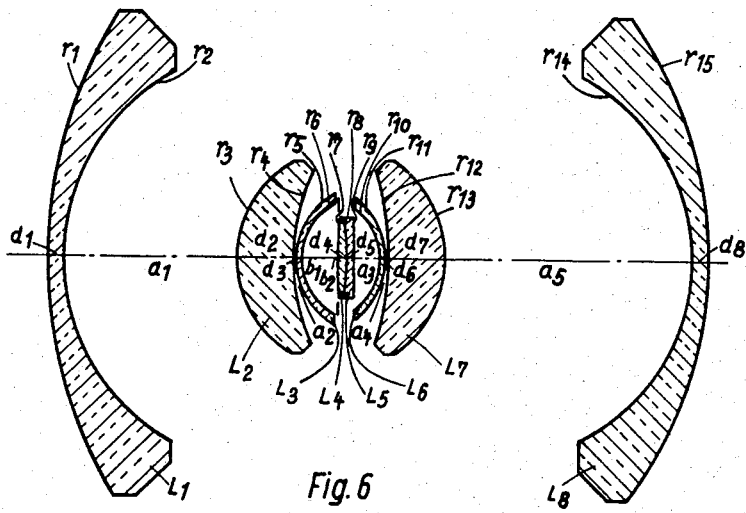

In the accompanying Figs. 5 and 6, two forms of construction of objectives in accordance with the invention are depicted whose dimensions are given in the following calculation examples. Figs. 7 and 8 show the error graphs of the sagittal (second principal section) and tangential (first principal section) image shells for the rays of the colours $d$ and $g$ of the spectrum which clearly show the considerable improvement regarding the chromatic deviations with a flattening of the image field at the same time. The legend is as follows:

L signifies the individual lenses,
r the radii of the lens surfaces,
d the thicknesses,
a the vertex distances of the individual lenses,
b the diaphragm position,
$n_d$ the refractive indices,
v the Abbe numbers of the glasses of the lenses.

The values of the examples are based on a focal length of $f=100$.

Both objectives have an aperture ratio of 1:5.6 and an image field of 90°.

1. *Execution example (Fig. 5)*

| Lenses | Radii | Thicknesses and Distances | $n_d$ | v |
|---|---|---|---|---|
| $L_1$ | $r_1= +141.31$ | $d_1= 4.24$ | 1.6031 | 60.7 |
|  | $r_2= + 68.816$ | $a_1=74.33$ |  |  |
|  | $r_3= + 32.795$ |  |  |  |
| $L_2$ |  | $d_2=17.52$ | 1.6080 | 46.2 |
|  | $r_4= + 65.435$ | $a_2= 0.01$ |  |  |
|  | $r_5= + 22.558$ |  |  |  |
| $L_3$ |  | $d_3= 1.13$ | 1.7847 | 25.7 |
|  | $r_6= + 19.118$ | $b_1=11.87$ |  |  |
|  | $r_7= +316.36$ | $b_2= 2.26$ |  |  |
| $L_4$ |  | $d_4= 2.54$ | 1.6204 | 60.3 |
| $L_5$ | $r_8= - 42.492$ | $d_5= 1.41$ | 1.6200 | 36.3 |
|  | $r_9= \infty$ | $a_3= 8.20$ |  |  |
|  | $r_{10}= - 19.118$ |  |  |  |
| $L_6$ |  | $d_6= 1.13$ | 1.7847 | 25.7 |
|  | $r_{11}= - 22.558$ | $a_4= 0.01$ |  |  |
|  | $r_{12}= - 72.370$ |  |  |  |
| $L_7$ |  | $d_7=17.52$ | 1.6074 | 56.7 |
|  | $r_{13}= - 34.738$ | $a_5=74.33$ |  |  |
|  | $r_{14}= - 67.346$ |  |  |  |
| $L_8$ |  | $d_8= 4.24$ | 1.6031 | 60.7 |
|  | $r_{15}= -136.32$ |  |  |  |

2. Execution example (Fig. 6)

| Lenses | Radii | Thicknesses and Distances | $n_d$ | $v$ |
|---|---|---|---|---|
| $L_1$ | $r_1=+138.64$ | $d_1= 4.16$ | 1.6031 | 60.7 |
|  | $r_2=+ 63.279$ | $a_1=51.99$ |  |  |
| $L_2$ | $r_3=+ 32.174$ | $d_2=16.64$ | 1.6056 | 43.9 |
|  | $r_4=+ 61.043$ | $a_2= 0.01$ |  |  |
| $L_3$ | $r_5=+ 22.292$ | $d_3= 1.11$ | 1.7847 | 25.7 |
|  | $r_6=+ 18.891$ | $b_1=10.40$ |  |  |
|  |  | $b_2= 0.00$ |  |  |
| $L_4$ | $r_7=+198.67$ | $d_4= 2.50$ | 1.6204 | 60.3 |
|  | $r_8=- 49.905$ |  |  |  |
| $L_5$ |  | $d_5= 1.38$ | 1.6200 | 36.3 |
|  | $r_9=+715.13$ | $a_3= 7.90$ |  |  |
|  | $r_{10}=- 18.891$ |  |  |  |
| $L_6$ |  | $d_6= 1.11$ | 1.7847 | 25.7 |
|  | $r_{11}=- 22.292$ | $a_4= 0.01$ |  |  |
| $L_7$ | $r_{12}=- 88.107$ | $d_7=17.19$ | 1.6088 | 58.9 |
|  | $r_{13}=- 34.327$ | $a_5=70.36$ |  |  |
|  | $r_{14}=- 60.171$ |  |  |  |
| $L_8$ |  | $d_8= 4.16$ | 1.6031 | 60.7 |
|  | $r_{15}=-121.80$ |  |  |  |

We claim:

A wide angle anastigmatic objective for aerial photography and projection purposes of the basic form containing at least two negative meniscus inner components concave toward each other and enclosing a central inner air space and a diaphragm therein, and two positive meniscus outer components concave toward the negative components and all axially aligned and airspaced apart, said four components being corrected especially for spherical aberration the objective being characterized by two further simple dispersive meniscus lenses, each of said dispersive meniscus lenses being operatively positioned as exterior elements enclosing the said four meniscus components and axially aligned with respect to the whole objective, and turning their concave inner surfaces toward said positive components and having air separations from said positive components of between $0.2 \cdot f$ and $0.8 \cdot f$, the radius of the outer convex surface of each of said dispersive exterior lenses lying between $1.0 \cdot f$ and $2.5 \cdot f$ and the radius of its inner concave surface lying between $0.45 \cdot f$ and $1.5 \cdot f$, and by the said inner central air space of the objective being greater than 80% and smaller than 200% of the arithmetic mean of the radii of curvature of the inner concave surfaces of said negative components bounding said air space, and by a substantially afocal correcting component located substantially at the diaphragm position for correcting for residual astigmatic zonal aberration of the objective, said correcting component having spherical outer surfaces the radii of which lie between $-1.5 \cdot f$ and $+1.5 \cdot f$, and the mean refractive index of said correcting component in combination with said radii being such that its refractive power lies between zero power and $+0.5/f$, $f$ being the focal length and $1/f$ the focal power of the objective.

References Cited in the file of this patent

UNITED STATES PATENTS

| | | |
|---|---|---|
| 2,031,792 | Richter | Feb. 25, 1936 |
| 2,116,264 | Hasselkus et al. | May 3, 1938 |
| 2,325,275 | Rayton | July 27, 1943 |
| 2,430,150 | Warmisham | Nov. 4, 1947 |
| 2,516,724 | Roossinov | July 25, 1950 |
| 2,596,799 | Tillyer et al. | May 13, 1952 |
| 2,683,398 | Klemt et al. | July 13, 1954 |
| 2,713,809 | Cook | July 26, 1955 |
| 2,721,499 | Bertele | Oct. 25, 1955 |